Patented Apr. 7, 1942

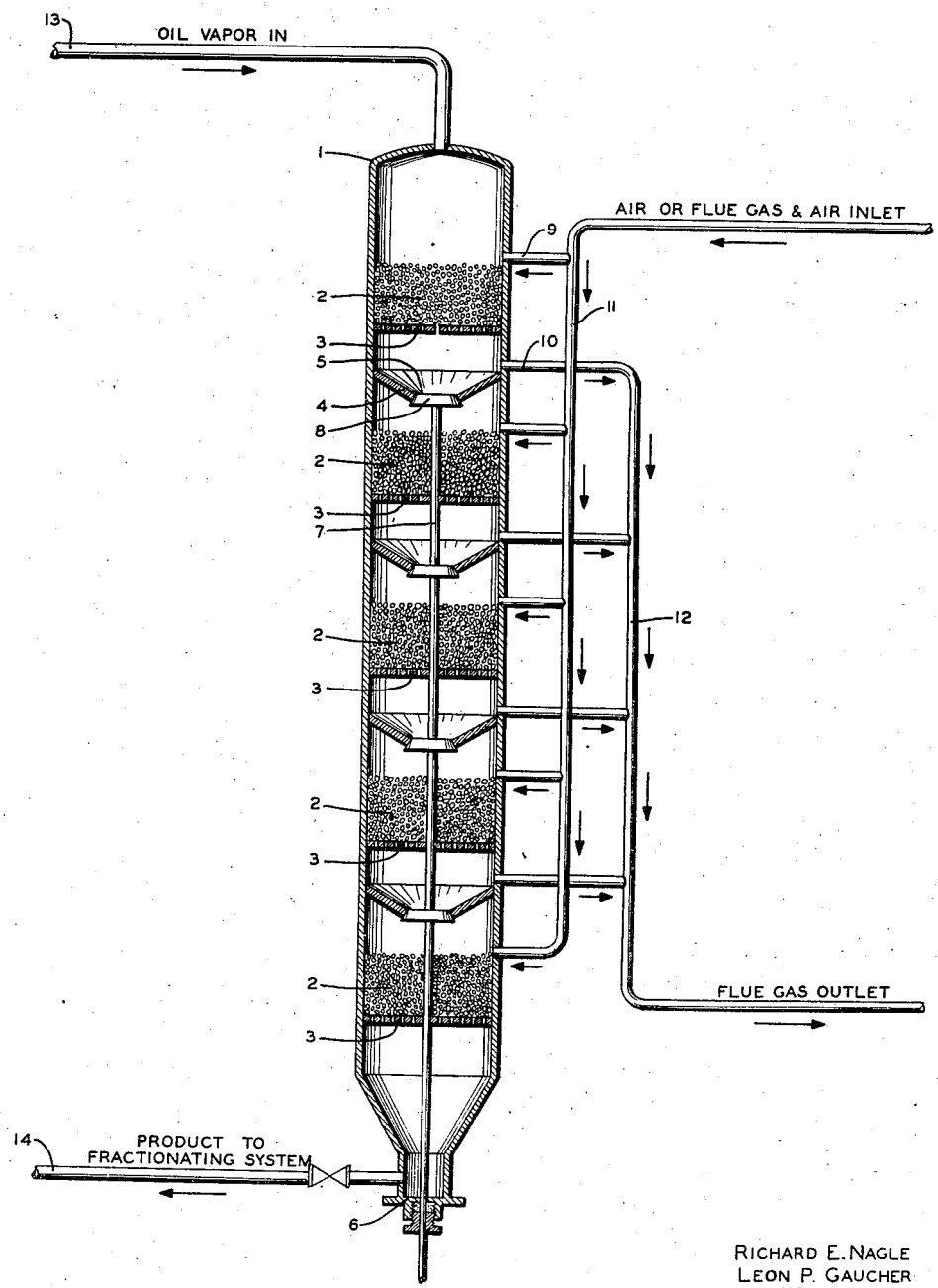

2,278,892

UNITED STATES PATENT OFFICE 2,278,892

CATALYTIC APPARATUS

Richard E. Nagle, New York, and Leon P. Gaucher, Mount Vernon, N. Y., assignors, by mesne assignments, to The Texas Company, New York, N. Y., a corporation of Delaware Application June 29, 1940, Serial No. 343,094

2 Claims. (Cl. 23—288)

This invention relates to catalysis of chemical reactions, particularly to a catalytic converter and method of regeneration of the catalyst employed in the converter.

The invention contemplates effecting catalytic treatment of fluid constituents, either gaseous or liquid, such as hydrocarbons, in a tower or vessel containing a solid catalyst in divided form and supported in a plurality of beds spaced vertically apart within the tower or vessel. During the catalytic treatment the material to be treated is charged to one end of the tower or vessel and caused to pass through the beds in succession and is subsequently withdrawn from the other end of the tower or vessel. The operation is continued until the catalyst becomes sufficiently spent to require regeneration or reactivation.

Means are provided within the tower for closing the space between each pair of adjacent catalyst beds during regeneration. Regeneration is effected by passing a suitable regenerating medium, such as air or flue gas, through the individual beds simultaneously until the mass has been regenerated. Thereafter, communication between the beds is re-established for the treatment of further charge material.

The invention has application in the catalytic treatment of petroleum hydrocarbons, such as, for example in the catalytic cracking of hydrocarbons for the production of low boiling hydrocarbons suitable in the manufacture of motor fuel. The catalyst may be made up of particles, lumps, pellets or pills and the like, and may be a silicious material, such as natural or artificial compounds of silica and alumina, with or without the addition of other active substances, such as certain metals, in finely-divided form, including those of nickel, copper, cobalt, manganese, etc.

The invention is applicable to various catalytic treating operations involving conversion or chemical transformation wherein deposition of carbonaceous material, or other impurities, upon the catalyst particles occurs, necessitating periodic reactivation of the catalyst. Such reactivation is usually accomplished by interrupting the flow of feed to the contact mass and then blowing air or flue gas through the mass to burn the deposited carbon and thereby restore the catalyst to its active state.

An object of the present invention is to facilitate reactivation of the catalyst, to avoid substantial injury and destruction of the catalyst and also to reduce the cost of reactivation.

In a packed tower type of conversion vessel with reactivation in the conventional manner, by blowing air or flue gas through the entire mass, an excessive pressure drop results when sufficient reactivating medium is used to reactivate in the desired time without excessive temperature rise. This high pressure drop is usually impractical from a cost standpoint.

Therefore, in accordance with this invention, the catalyst is supported within the tower in a plurality of shallow beds. The space between each pair of adjacent beds is closed so as to discontinue fluid flow from bed to bed. The regenerating medium is then passed through each of the several beds simultaneously and removed immediately after passing through each bed. In this manner the path of the reacting gases is so short that the gas and the carbon and catalyst are not in contact long enough to attain the high temperatures which are injurious to the catalyst. The gas entering each successive bed is at the same temperature as the gas entering the first bed.

Regeneration is thus effected with a greatly reduced pressure drop through the catalyst mass, thereby permitting the use of blowers, or compressors with low pressure differential, for the handling of the reactivation gases.

In order to describe the invention further, reference will now be made to the accompanying drawing comprising a diagrammatic sketch of the converter of this invention.

As indicated in the drawing, the converter comprises a cylindrical vertical vessel 1 containing a plurality of relatively shallow catalyst beds 2. The depth of the beds may be around one to four feet, for example.

Each bed is supported on a perforated support 3.

In the space between each pair of adjacent beds is a conical diaphragm or partition 4 having a port 5 at its vertex. The conical diaphragms or partitions are advantageously in an inverted position so as to facilitate dumping of the catalyst from the tower. To facilitate such dumping the supports 3 may be hinged so as to drop or fold to permit the catalyst material to fall upon the diaphragm 4 which acts as a funnel and permits the catalyst material to flow through the central opening at its vertex. In this way the catalyst material falls to the bottom of the tower and may be removed therefrom through a manhole 6.

A shaft 7 extends vertically through the central portion of the tower and thus passes through each bed, as well as through the central openings in the diaphragms 4.

Imperforate disks 8 are integrally attached to the shaft 7 at points adjacent the diaphragm openings and are adapted, upon raising the shaft 7, to close the ports 5, thus closing communication between the successive beds and virtually dividing the tower into a plurality of substantially closed chambers.

A plurality of pipes 9 communicate with the tower at points just above each catalyst bed and below the diaphragms 4. Likewise, a plurality of pipes 10 communicate with the tower at points just below each catalyst bed.

The pipes 9 lead to a manifold pipe 11, communicating with a source of air of flue gas not shown. The pipes 10 likewise lead to a manifold pipe 12, through which the air or flue gas after passage through the catalyst beds may be discharged.

In actual operation, as, for example, during the catalytic cracking of hydrocarbon oil, the oil advantageously in vapor form is introduced to the top of the tower from a source not shown through a pipe 13. During this time the shaft 7 is in a lowered position so as to maintain the port 5 in the open position. The oil vapor, at a temperature which may range from 750 to 1000° F., for example, passes downwardly through the tower, flowing through each bed of catalyst in succession.

Upon passing through the last bed at the bottom of the tower, the contacted hydrocarbons are discharged therefrom to suitable fractionating equipment not shown, through a pipe 14.

Charging of the hydrocarbons through the tower is thus continued for a period of around 10 minutes to 4 hours until activity of the catalyst has decreased to such a point that regeneration is necessary.

At this point the introduction of hydrocarbon feed through the pipe 13 is discontinued and the shaft 7 is raised so as to close the ports 5. The regenerating gas at a temperature of around 850-950° F. is then introduced from the pipe 11 so as to pass through each of the beds 2 simultaneously for a period of around 10 minutes to 4 hours until reactivation is completed. The regenerating gas may comprise an oxygen containing gas such as a mixture of air and flue gas.

When regeneration is completed the shaft 7 is lowered so as to re-establish communications between each successive bed and charging of the hydrocarbon feed through the pipe 13 is resumed. Likewise, the pipes 9 and 10 are closed.

While charging of the hydrocarbons to the top of the tower has been described, it is contemplated that the direction of flow may be reversed so that the feed gases enter at the bottom of the tower and the contacted material is withdrawn from the top of the tower.

The temperatures mentioned above are by way of example only and may be varied, depending upon the nature of the conversion operation. Likewise, the tower may be operated at atmospheric pressure or at pressures either above or below atmospheric.

The rate of flow of the feed hydrocarbons through the catalyst should be adjusted so as to maintain the proper time of contact between the charge and the catalyst mass.

Obviously many modifications and variations, of the invention, as hereinbefore set forth, may be made without departing from the spirit and scope thereof, and therefore only such limitations should be imposed as are indicated in the appended claims.

We claim:

1. Apparatus for effecting chemical transformation of a fluid substance by contact with a solid catalyst in divided form, comprising a vertical vessel, a plurality of beds of catalytic material supported within the vessel and spaced vertically apart, inverted conical diaphragm members between each bed, each member having a port at its vertex, a vertical shaft within the vessel extending through the beds and through the ports of said diaphragm members, said shaft being capable of vertical movement, disk members integral with the shaft adjacent the ports in each diaphragm member and adapted to form a closure for said ports upon raising the shaft, conduits for introducing fluid between the top of each bed and its adjacent diaphragm member, conduits for separately and simultaneously introducing fluid to each catalyst bed and removing it after passage through each bed when the said ports are closed, an inlet conduit for introducing fluid to the top of said vessel, and an outlet conduit for discharging fluid from the bottom of said vessel, said inlet and outlet conduits permitting series flow of fluid through the beds when the port in each diaphragm is open.

2. Apparatus for effecting chemical transformation of a fluid substance by contact with a solid pulverulent catalyst comprising a vertical reaction vessel having a conical bottom, an opening in the vertex of the conical bottom, a stuffing box in said opening, a plurality of beds of catalytic material supported within the vessel and spaced vertically apart, inverted conical diaphragm members between each bed, each member having a port at its vertex, a vertical shaft projected through said stuffing box and extending within the vessel through the beds and through the ports of said diaphragm members, said shaft being of substantially less diameter than the diameter of the ports in each diaphragm member and being capable of vertical movement, disk members integral with the shaft adjacent the ports in each diaphragm member and adapted to form a closure for said diaphragm ports upon raising the shaft, conduits for introducing fluid between the top of each bed and its adjacent diaphragm member, conduits for separately and simultaneously introducing fluid to each catalyst bed and removing it after passage through each bed when the said diaphragm ports are closed, an inlet conduit for introducing fluid to the top of said vessel, and an outlet conduit for discharging fluid from the bottom of said vessel, said inlet and outlet conduits permitting series flow of fluid through the beds when the port in each diaphragm is open.

RICHARD E. NAGLE.
LEON P. GAUCHER.